United States Patent [19]

Matsunaga

[11] Patent Number: 4,747,137

[45] Date of Patent: May 24, 1988

[54] SPEECH SCRAMBLER

[75] Inventor: Akira Matsunaga, Tokyo, Japan

[73] Assignee: Kokusai Denshin Denwa Kabushiki Kaisha, Tokyo, Japan

[21] Appl. No.: 880,273

[22] Filed: Jun. 30, 1986

[30] Foreign Application Priority Data

Jul. 16, 1985 [JP] Japan ................................ 60-155230

[51] Int. Cl.[4] ................................................ H04L 9/00

[52] U.S. Cl. ........................................... 380/6; 380/9; 380/28

[58] Field of Search ......................... 358/120; 364/725; 179/1.5 R, 1.5 S; 360/32; 380/6, 9, 8, 28, 41; 381/43, 45

[56] References Cited

U.S. PATENT DOCUMENTS

| | | | |
|---|---|---|---|
| 2,129,860 | 9/1938 | Mitchell | 380/6 |
| 4,210,931 | 7/1980 | Bailey et al. | 360/32 |
| 4,232,194 | 11/1980 | Adams | 179/1.5 R |
| 4,390,898 | 6/1983 | Bond et al. | 358/120 |
| 4,446,530 | 5/1984 | Tsuboka | 364/725 |

*Primary Examiner*—Salvatore Cangialosi
*Assistant Examiner*—Aaron J. Lewis
*Attorney, Agent, or Firm*—Emmanuel J. Lobato; Robert E. Burns

[57] ABSTRACT

A speech scrambler is disclosed, in which a frequency spectrum obtained by an orthogonal transform of a time domain signal is divided into a plurality of blocks in the frequency domain. One of the blocks which has energy less than a predetermined value is adaptively replaced by a dummy spectrum. The resulting spectrum is rearranged in accordance with a predetermined rule. The frequency spectrum is subjected to an inverse othogonal transform to obtain a time domain signal for transmission. The orthogonal transform is fast Fourier transform or fast Hadamard transform.

10 Claims, 4 Drawing Sheets

SPEECH SCRAMBLER

BACKGROUND OF THE INVENTION

The present invention relates to a speech scrambler, and more particularly to a speech scrambler which employs are orthogonal transformation technique, such as fast Fourier transform (FFT) or fast Hadamard transform.

Widely known speech scramblers are roughly divided into those which involve signal processing in a frequency domain, such as a frequency inversion method and a scrambler which divides a voice signal into a plurality of frequency slots and then rearranges the slots with or without frequency inversion in each slot, and those which involve signal processing in the time domain, such as a system which sections a voice signal into blocks in terms of time and changes the order of sample values in each block or inverts the sign of each sample value.

In recent years there have also been proposed a scrambler which combines signal processing in frequency domain and time domain, and a scrambler which utilizes an orthogonal transform.

A prior art example of this kind is disclosed in Japanese Pat. Disc. Gazette No. 153862/81. This is a scrambler which rearranges frequency spectrums obtained by a fast Fourier transform or a fast Hadamard transform of a voice signal in accordance with a predetermined rule, and transmits the time domain signal after the inverse transform.

With the prior art system, the rule for rearranging the spectrum is predetermined by the scrambling key and the number of keys available is so large that even if a scrambled telephone signal is wiretapped, it would be difficult to detect the spectrum rearrangement rule employed and descramble as the original voice signal; hence this system seems to ensure the security of communication. However, since the security function of this system depends on how to rearrange the spectrum of the original voice signal, the total amount of energy remains unchanged before and after the operation. Consequently, the scrambled signal produced by the operation still retains the intonation of the original speech. Thus, the intensity of the original speech and unvoiced silent period therein can be readily detected. For instance, even if such a scrambler is employed in a communication circuit for stereotyped conversations, their contents might be understood to some extent by experience. Even if the contents of communication cannot be directly understood from the scrambled voice, voiced sections to be deciphered can easily be located. Therefore, the conventional speech scrambler possesses such a serious drawback that its security is not necessarily satisfactory.

In addition, the prior art merely rearranges the spectrum of a voice signal, and hence does not effectively serve the purpose for voices of little energy, for example, at the beginning and the end of a speech and for a voice of little energy and flat spectrum, such as a fricative sound.

SUMMARY OF THE INVENTION

In view of the above shortcomings of the prior art, an object of the present invention is to provide a speech scrambler which makes it difficult to distinguish silence and fricative sounds and produces a scrambled voice signal with no trace of intonation of the original voice, ensuring the security of communication.

To attain the above object, the present invention is characterized in that a low power band portion of a voice spectrum obtained by an orthogonal transform of the voice signal, such as a fast Fourier or Hadamard transformation, is adaptively removed and is substituted by a dummy spectrum; the resulting spectrum is rearranged, and the voice signal is transformed by an inverse transform into a time domain signal for transmission. The power of the spectrum removed should be low enough to have no influence on the descrambled speech quality. At the receiving side, the received signal is subjected to an orthogonal transform, the resulting spectrum is inversely rearranged to its original order, the dummy spectrum is eliminated therefrom, and then the signal is transformed into a time domain by an inverse orthogonal transform, thereby obtaining a descrambled voice signal.

The dummy spectrum has such an energy distribution that it does not appear in the actual voice spectrum, and is distinguishable only when descrambled by a correct descrambling key.

The spectrum to be removed has little effect on the original voice signal, and hence will not affect the descrambled speech quality. On the other hand, the dummy spectrum inserted has certain energy, so that after rearranged, it acts as interference components and suppresses the intonation of original speech, producing an effect of masking voice information when the volume of the original speech is small.

BRIEF DESCRIPTION OF THE DRAWINGS

The present invention will be described in detail below with reference to the accompanying drawings, in which.

DETAILED DESCRIPTION

Figure 1:
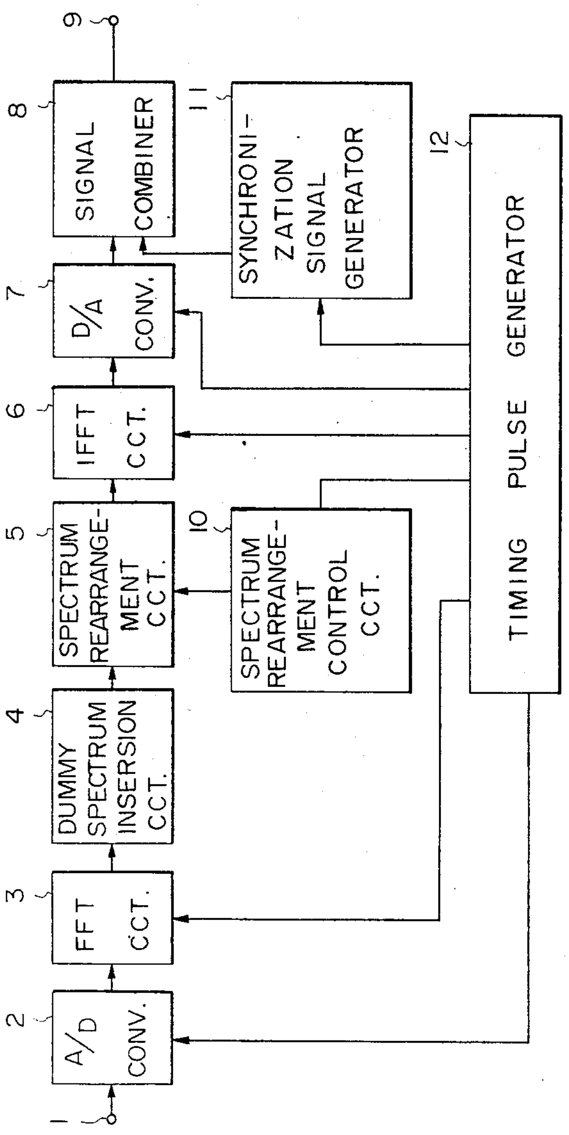
FIG. 1 is a block diagram illustrating an embodiment of the present invention.

Incidentally, in the following description, a fast Fourier transform is utilized an orthognal transform technique. FIG. 1 illustrates an embodiment of the present invention. In FIG. 1, reference numeral 1 indicates an input terminal for voice signals to be transmitted, 2 an A/D converter, 3 a fast Fourier transformation circuit (hereinafter referred to as the FFT circuit), 4 a dummy spectrum insertion circuit, 5 a spectrum rearrangement circuit, 6 an inverse fast Fourier transform circuit (hereinafter referred to as the IFFT circuit), 7 a D/A converter, 8 a signal combiner, 9 an output terminal, 10 a spectrum rearrangement control circuit, 11 a synchronization signal generator, and 12 a timing pulse generator.

Figure 3:
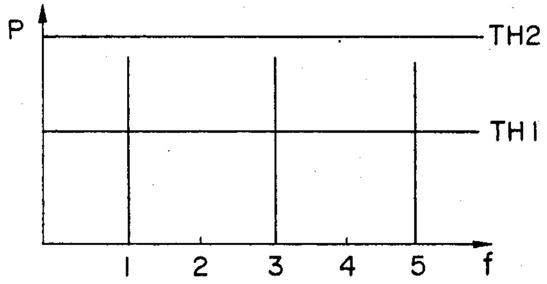
FIG. 3 is a diagram of a frequency spectrum explanatory of a dummy spectrum insertion rule for use in the present invention.

A voice signal of 4 KHz band from the input terminal 1 is converted to a digital signal by the A/D converter 2 and transformed into frequency domain by the FFT circuit 3. The dummy spectrum insertion circuit 4 divides the spectrum obtained by the FFT circuit 3 into a plurality of blocks, each of which is composed of consecutive FFT coefficients. In this case, the dummy spectrum insertion circuit 4 calculates the total energy of each block, and when the energy is less than a certain threshold value, replaces the block by a dummy spectrum. The threshold value must be selected such that elimination of the spectrum from the original speech will not affect the descrambled speech quality. The dummy spectrum to be inserted is composed of coefficients having certain energy and coefficients of no power. These coefficients in one block are arranged in such an order as don't exist in the actual voice spectrum. For example, it is possible to divide the spectrum into 17 blocks, each having five coefficients, to replace alternate three of the five coefficients of each block with coefficients of values greater than a thershold value TH1 but smaller than a threshold value TH2, and to make the remaining two coefficients zero, as shown in FIG. 3. Besides, the values of the three coefficients are made uncorrelated using random numbers. With such a method, since adjacent coefficients of the actual voice spectrum have a certain degree of correlation, the receiving side can easily distinguish the dummy spectrum from the original voice spectrum after rearranging the spectram in proper order. There is no need to transmit the information about the dummy spectrum locations.

The frequency signal with the dummy spectrum inserted thereinto is provided to the spectrum rearrangement circuit 5, where the spectrum is rearranged in accordance with a predetermined rule which is controlled by the spectrum rearrangement control circuit 10. In this case, it is effective, for ensuring the security of communication, to rearrange the spectrum on one coefficient basis, as set forth in the aforementioned prior art (Japanese Pat. Disc. Gazette No. 153862/81).

Figure 4:
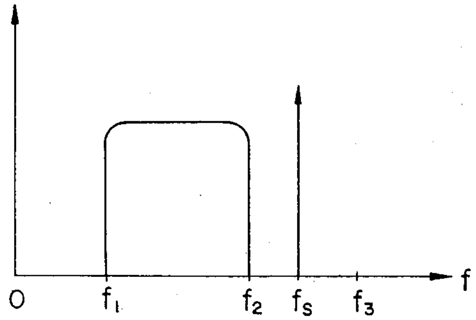
FIG. 4 is a frequency diagram explanatory of the transmission of a synchronization signal for use in the present invention.

The rearranged spectrum is transformed into a time domain signal by the IFFT circuit 6. Thereafter, the D/A converter 7 converts it to an analog signal, which is combined with a synchronization signal from the synchronization signal generator 11 in the combining circuit 8, thereafter transmitted from the output terminal 9. The synchronization signal needs to perform a sample synchronization for sampling the analog signal and a frame synchronization for identifying FFT frames. In this embodiment, a pilot signal $f_s$ modulated by frame synchronization timing is placed besides the frequency band of the voice signal, as shown in FIG. 4. In FIG. 4, letting $f_1$, $f_2$ and $f_3$ represent the lower limit frequency of the voice signal, the upper limit frequency of the voice signal, and the upper limit frequency of the transmission line, respectively, the above pilot signal $f_s$ is inserted between the frequencies $f_2$ and $f_3$.

In this embodiment, since the FFT circuit 3 and the IFFT circuit 6 are nearly identical in function, they can also be formed into a single circuit for use on a time-shared basis.

Figure 5:
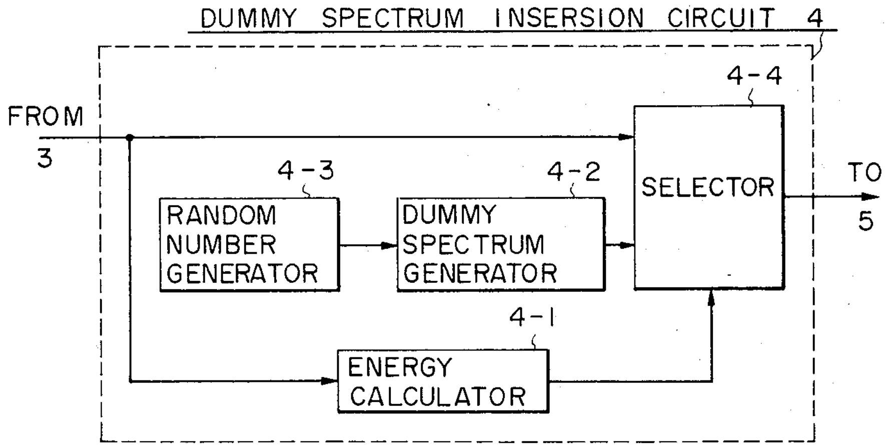
FIG. 5 is a block diagram illustrating an example of a dummy spectrum insertion circuit employed in the embodiment depicted in FIG. 1.

FIG. 5 illustrates an example of the arrangement of the dummy spectrum insertion circuit 4. In FIG. 5 an energy calculator 4-1 calculates the total energy of each block of the original voice spectrum and decides whether to replace the block with the dummy spectrum. A dummy spectrum generator 4-2 generates a dummy spectrum having an amount of energy within a certain range. The values of coefficients are determined within a fixed range in accordance with random numbers, which are generated by a random number generator 4-3. A selector 4-4 selects the output of the FFT circuit 3 or the output of the dummy spectrum generator 4-2 under control of the energy calculator 4-1.

Next, an example of the receiving side for receiving the scrambled signal transmitted by this invention system will be described.

Figure 2:
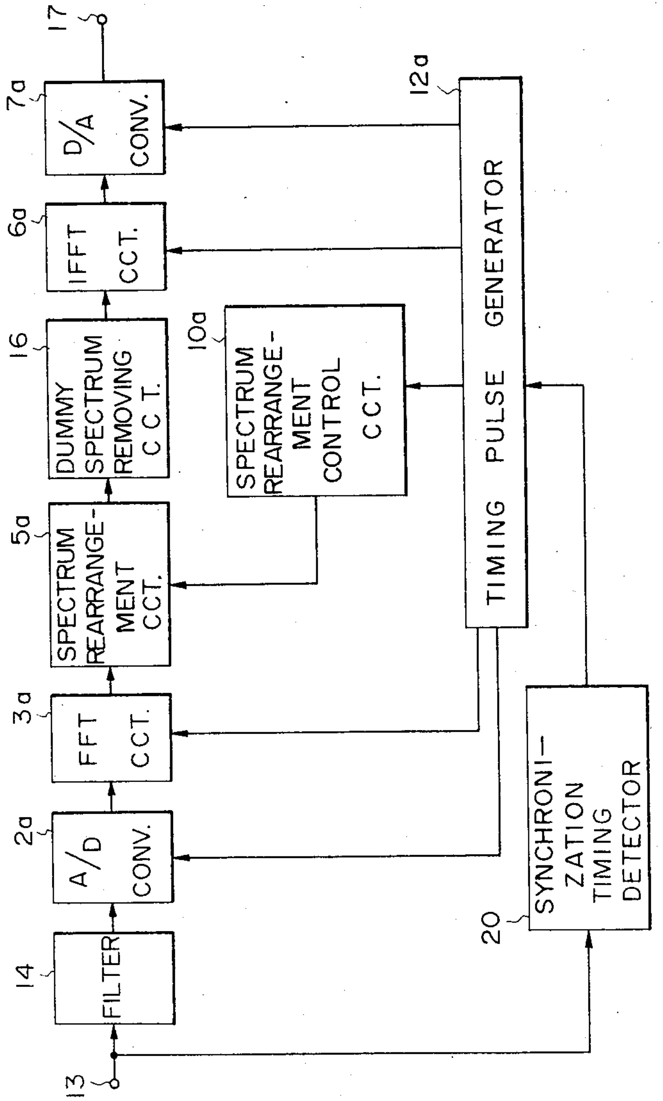
FIG. 2 is a block diagram illustrating an example of the arrangement of the receiving side which receives a scrambled signal transmitted in accordance with the present invention.

FIG. 2 illustrates an example of the circuitry at the receiving side. In FIG. 2 reference numeral 13 identifies an input terminal, 14 a filter for removing the synchronization signal, 16 a dummy spectrum removing circuit, 17 an output terminal, and 20 a synchronization signal extractor. The circuits designated by the other numerals *2a, 3a, 5a, 6a 7a* **10*a* and 12*a* are identical with those 2, 3, 5, 6, 7, 10 and 12 in FIG. 1. A signal applied to the input terminal 13 is fed to the filter 14**, wherein its synchronization signal component is removed. Then the signal is converted into a frequency domain signal by the FFT circuit *3a*.

The signal thus obtained is applied to the spectrum rearrangement circuit *5a*, which rearranges the spectrum in the same order as that at the transmitting side. The dummy spectrum removing circuit 16 checks whether the spectrum of each block is the dummy spectrum or not and replaces the dummy spectrum by a spectrum whose coefficients are all zero. Thereafter, the signal transformed into a time domain signal by the IFFT circuit *6a* is converted into an analog signal by the D/A converter *7a* and then transmitted from the output terminal 17. The timing of each circuit is controlled by synchronization timing pulses which are generated by the timing generator **12*a* from a synchronization signal obtained by the synchronization signal extractor 20**.

Next, a detailed description will be given of the dummy spectrum removing circuit 16 employed in the above example of the receiving side.

Figure 6:
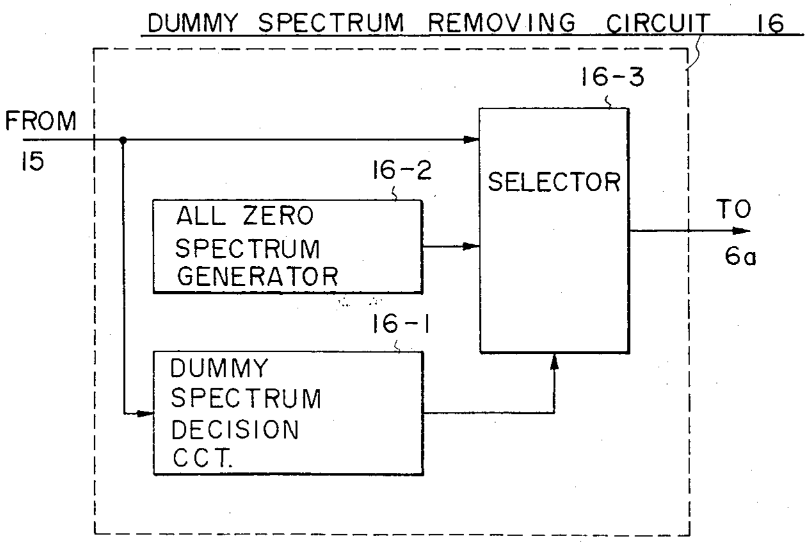
FIG. 6 is a block diagram illustrating an example of a dummy spectrum removing circuit for use in the example of the receiving side shown in FIG. 2.

FIG. 6 illustrates an example of the dummy spectrum remove circuit 16. In FIG. 6, a dummy spectrum decision circuit 16-1 calculates correlation between FFT coefficients in each block and when the correlation is smaller than a predetermined value, decides the signal spectrum to be dummy and then replaces it, in a selector 16-3, by a spectrum of all zero coefficient which is produced from an all zero spectrum generator 16-2.

For example, a check operation may be performed for the spectrum by the use of a coefficient C which is defined by the following expression (1):

$$C = \frac{\sum_{i=2}^{5} |S_i|\ |S_{i-1}|}{\sum_{i=2}^{5} |S_{i-1}|^2} \qquad (1)$$

In expression (1), it is assumed that one block is composed of five coefficients and each coefficient in a block is denoted by $S_i$ (where $i=1$ to 5) of complex number. In case of FIG. 3 described previously, when the influence of noise is ignored, the coefficient C for the dummy spectrum will go to zero. On the other hand, in the actual voice spectrum, adjacent coefficients have a significant correlation to each other and the coefficient C has a value close to 1; so the decision is possible. Where the coefficients in each dummy spectrum are arranged in such a manner that the coefficient C becomes smaller, there is no particular need to follow the example depicted in FIG. 3, and the arrangement of the coefficients in one block may also be determined independently on each block basis.

In the event that the arrangement of the coefficients in each block of the dummy spectrum is limited to be included in several kinds, the above-described circuit may also be replaced by a decision circuit which decides the dummy spectrum by comparing the coefficients with two sets of threshold values.

As described above in detail, in accordance with the present invention, a little energy portion of a voice spectrum is replaced by a dummy spectrum, so that a scrambled voice signal is prevented from retaining the intonation of the original speech, thus the security of the system is improved.

What I claim is:

1. A speech scrambler comprising an input terminal for voice signals, an A/D converter for converting a signal received at the input terminal into a digital signal, an FFT circuit for transforming the digital signal into a frequency domain signal, a dummy sprectrum insertion circuit for dividing a spectrum obtained by said FFT circuit into a plurality of blocks each comprised of consecutive FFT coefficients and calculating as a function of the FFT coefficients from the FFT circuit the total energy of each block so that blocks having energy below a given threshold energy value are replaced by a corresponding dummy spectrum, a spectrum rearrangement circuit receptive of the frequency domain signal with dummy spectra and for rearranging the frequency domain signal blocks in accordance with a given rule, a spectrum rearrangement control circuit for determining said rule, an IFFT circuit receptive of the rearranged frequency domain signal and for transforming it into a time domain signal, a D/A converter for converting said time domain signal into an analog signal, a synchronous signal generator for generating a synchronizing signal, a signal combiner for combining into a combined signal, the last mentioned analog signal and the synchronizing signal, and an output terminal for outputting said combined signal.

2. A speech scrambler according to claim 1, in which, the dummy spectrum insertion circuit comprises, an energy calculator receptive of the output of the FFT circuit for calculating the total energy of each block of the original voice spectrum and deciding whether to replace the block by a dummy spectrum, a dummy spectrum generator for generating a dummy spectrum having an amount of energy within a certain value, a random number generator for generating random numbers within a given range in correspondence to the values of the coefficient, and a selector for selecting the output of the FFT circuit or output of the dummy spectrum generator under control of the energy calculator as output of the dummy spectrum insertion circuit.

3. A speech scrambler according to claim 1, including a timing pulse generator for generating timing pulses for timing the circuit of the speech scrambler.

4. For use in combination with said speech scrambler according to claim 1, a receiver having an input terminal for receiving the combined signal output of the speech scrambler, a filter for removing the synchronization signal from the combined signal received, an A/D converter for converting the combined signal received from the filter into a combined digital signal, an FFT circuit for converting the combined digital signal into a frequency domain signal, a spectrum rearrangement circuit for rearranging the frequency domain signal to a same spectrum order as the order thereof in the scrambler, a dummy spectrum removing circuit for checking whether the spectrum of each block is a dummy spectrum and for replacing each dummy spectrum by a spectrum whose coefficients are all zero, an IFFT circuit for converting the signal into a time domain signal, a D/A converter for converting the time domain signal into an analog signal, an output terminal for outputting the analog signal, and a timing pulse generator for generating dummy pulses applied for timing the circuits.

5. The receiver according to claim 4, in which said dummy spectrum removing circuit comprises a dummy spectrum decision circuit for calculating correlation between FFT coefficients in each block, for deciding the signal spectrum to be a dummy and replacing the dummy spectrum by a replacement spectrum of all zero coefficients when the correlation is smaller than a predetermined value, a zero coefficient spectrum generator, and a selector for selecting of application of the replacement spectrum or not to the IFFT circuit.

6. A speech scrambling system comprising a speech scrambler having an input terminal for voice signals, an A/D converter for converting a voice signal received into a digital signal, an orthogonal transform circuit for effecting an orthogonal transformation of the digital signal into a frequency domain signal, a dummy spectrum insertion circuit for dividing a spectrum obtained by said orthogonal transform circuit into a plurality of blocks each comprised of consecutive orthogonal transform coefficients and calculating as a function of the FFT coefficients from the FFT circuit the total energy of each block so that the individual blocks having energy below a given threshold energy value are replaced by a corresponding dummy spectrum, a spectrum rearrangement circuit receptive of the frequency with dummy spectra and for rearranging the frequency domain signal blocks in accordance with a given rule, a spectrum rearrangement control circuit for determining said rule, a fast transform circuit receptive of the rearranged frequency domain and for transforming it into a time domain signal, a D/A converter for converting said time domain signal into an analog circuit, a synchronous signal generator for generating a synchronizing signal, a signal combiner for combining into a combined signal the last mentioned analog signal and the synchronizing signal, and an output terminal for outputting said combined signal.

7. A speech scrambling system comprising a speech scrambler according to claim 6, in which the orthogonal transform circuit is a fast Fourier transform circuit.

8. A speech scrambling system comprising a speech scrambler according to claim 6, in which the orthogonal transform circuit is a fast Hadamard transform circuit.

9. A speech scrambling system comprising a speech scrambler according to claim 6, including a receiver having an input terminal for receiving the combined signal output of the speech scrambler, a filter for removing the synchronization signal from the combined signal received, an A/D converter for converting the combined signal received from the filter into a combined digital signal, an orthogonal transform circuit for effecting an orthogonal transformation of the combined digital signal into a frequency domain signal, a spectrum rearrangement circuit for rearranging the frequency domain signal to a same spectrum order as the order thereof in the scrambler, a dummy spectrum removing circuit for checking whether the spectrum of each block is a dummy spectrum and for replacing each dummy spectrum by a spectrum whose coefficients are all zero, a fast transform circuit for converting the signal into a time domain signal, a D/A converter for converting the time domain signal into an analog signal, an output terminal for outputting the analog signal, and a timing pulse generator for generating timing pulses applied for timing the circuits.

10. For use in combination with said speech scrambler according to claim 1, a receiver comprising, an input terminal for receiving the combined signal output of the speech scrambler, a filter for removing the synchronization signal from the combined signal received, an A/D converter for converting the combined signal received from the filter into a combined digital signal, an FFT circuit for converting the combined digital signal into a frequency domain signal, a spectrum rearrangement circuit for rearranging the frequency domain signal to a same spectrum order thereof in the scrambler, a dummy spectrum removing circuit for checking whether the spectrum of each block is a dummy spectrum by comparing the coefficients of the spectrum with threshold values and for replacing each dummy spectrum by a spectrum whose coefficients are all zero, an IFFT circuit for converting the time domain signal into an analog signal, an output terminal for outputting the analog signal, and a timing pulse generator for generating dummy pulses applied for timing the circuits.

* * * * *